(12) United States Patent
Floan et al.

(10) Patent No.: US 9,976,597 B2
(45) Date of Patent: May 22, 2018

(54) BEARING ASSEMBLY FOR EXTRACTOR SYSTEMS

(71) Applicant: Crown Iron Works Company, Roseville, MN (US)

(72) Inventors: Benjamin Wayne Floan, Andover, MN (US); George E. Anderson, Champlin, MN (US)

(73) Assignee: Crown Iron Works Company, Roseville, MN (US)

( * ) Notice: Subject to any disclaimer, the term of this patent is extended or adjusted under 35 U.S.C. 154(b) by 0 days. days.

(21) Appl. No.: 14/835,340

(22) Filed: Aug. 25, 2015

(65) Prior Publication Data
US 2017/0058947 A1    Mar. 2, 2017

(51) Int. Cl.
| F16C 23/02 | (2006.01) |
| F16C 33/74 | (2006.01) |
| B01D 11/02 | (2006.01) |
| F16C 35/02 | (2006.01) |
| F16C 23/04 | (2006.01) |
| F16C 33/04 | (2006.01) |

(Continued)

(52) U.S. Cl.
CPC .......... *F16C 33/74* (2013.01); *B01D 11/0223* (2013.01); *B01D 11/0269* (2013.01); *F16C 23/04* (2013.01); *F16C 33/043* (2013.01); *F16C 33/201* (2013.01); *F16C 35/02* (2013.01); *B01D 2011/002* (2013.01); *F16C 2208/02* (2013.01); *F16C 2208/58* (2013.01)

(58) Field of Classification Search
CPC ......... F16C 23/02; F16C 23/041; F16C 27/02
See application file for complete search history.

(56) References Cited

U.S. PATENT DOCUMENTS 465,691 A * 12/1891 Burns ............... F16C 23/04
                                               384/205
2,012,714 A    8/1935 Glatt
(Continued)

FOREIGN PATENT DOCUMENTS

| JP | 2013036596 A | 2/2013 |
| JP | 2013053692 A | 3/2013 |
| WO | 2008081688 A1 | 7/2008 |

OTHER PUBLICATIONS

International Patent Application No. PCT/US2016/045955, International Search Report and Written Opinion dated Dec. 27, 2016, 18 pages.

*Primary Examiner* — Thomas R Hannon
(74) *Attorney, Agent, or Firm* — Fredrikson & Byron, P.A.

(57) ABSTRACT

A bearing assembly can be used in liquid service applications where the bearing assembly is intermittently or continuously exposed to liquid, such as below the liquid level of a solid-liquid extractor. In some examples, the bearing assembly includes an annular sleeve and an annular bearing. The annular sleeve is designed to be installed over the end of a rotatable shaft and positioned inside of a housing through which the rotatable shaft at least partially protrudes. The annular sleeve has an outer surface and length parallel to the rotational axis of the rotatable shaft. The outer surface of the annular sleeve may taper radially inwardly along at least a portion of the length of the sleeve. As a result, the bearing assembly and rotatable shaft positioned therein may pivot within housing about the taper of the annular sleeve.

23 Claims, 6 Drawing Sheets

(51) Int. Cl.
*F16C 33/20* (2006.01)
*B01D 11/00* (2006.01)

(56) References Cited

U.S. PATENT DOCUMENTS

| | | | | |
|---|---|---|---|---|
| 2,295,139 A | * | 9/1942 | Topanelian, Jr. | F16C 27/063 384/222 |
| 3,443,794 A | | 5/1969 | Peterson | |
| 3,494,543 A | | 2/1970 | Doyle et al. | |
| 3,574,492 A | * | 4/1971 | Schwary | F01C 1/086 384/202 |
| 3,659,910 A | * | 5/1972 | Foster | F16C 32/067 384/119 |
| 3,778,123 A | | 12/1973 | Hendler et al. | |
| 4,056,337 A | * | 11/1977 | Zorn | F01C 21/02 418/131 |
| 4,336,006 A | * | 6/1982 | Grabow | F04C 2/086 384/192 |
| 4,375,264 A | | 3/1983 | Porter | |
| 4,605,363 A | * | 8/1986 | Walsh | F01C 21/02 384/192 |
| 4,660,989 A | | 4/1987 | Davis | |
| 5,161,748 A | * | 11/1992 | Iguchi | H01L 39/2448 242/376.1 |
| 5,328,275 A | | 7/1994 | Winn et al. | |
| 5,375,934 A | | 12/1994 | Hall et al. | |
| 5,618,107 A | | 4/1997 | Bartsch | |
| 5,813,768 A | * | 9/1998 | Lyon | F16C 23/04 384/192 |
| 5,827,042 A | | 10/1998 | Ramsay | |
| 6,377,658 B1 | | 4/2002 | Vermilyea et al. | |
| 7,223,019 B2 | * | 5/2007 | Hoppe | F04B 1/2071 384/192 |
| 7,344,313 B2 | | 3/2008 | Hansen et al. | |
| 8,308,366 B2 | * | 11/2012 | Clements | F04C 2/348 384/192 |
| 8,500,333 B2 | * | 8/2013 | Osgood | F16C 23/046 384/192 |
| 2002/0081050 A1 | * | 6/2002 | Cermak | |
| 2012/0144939 A1 | | 6/2012 | Kullin et al. | |

* cited by examiner

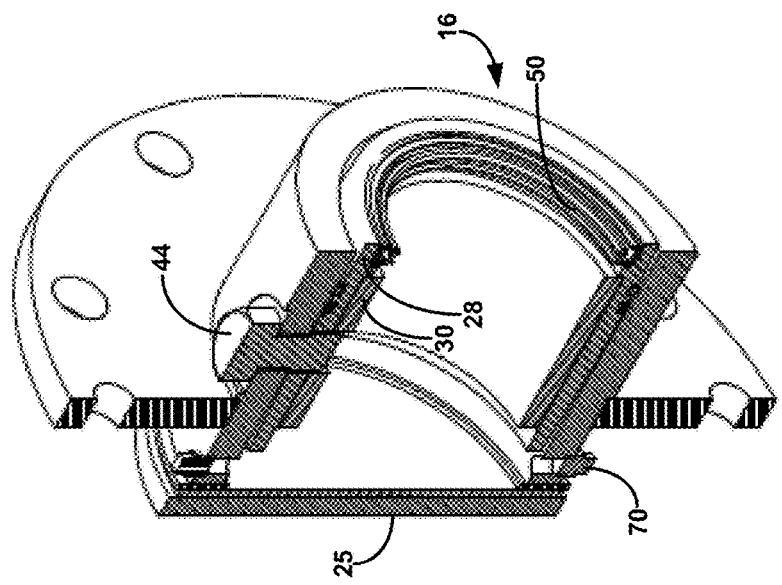
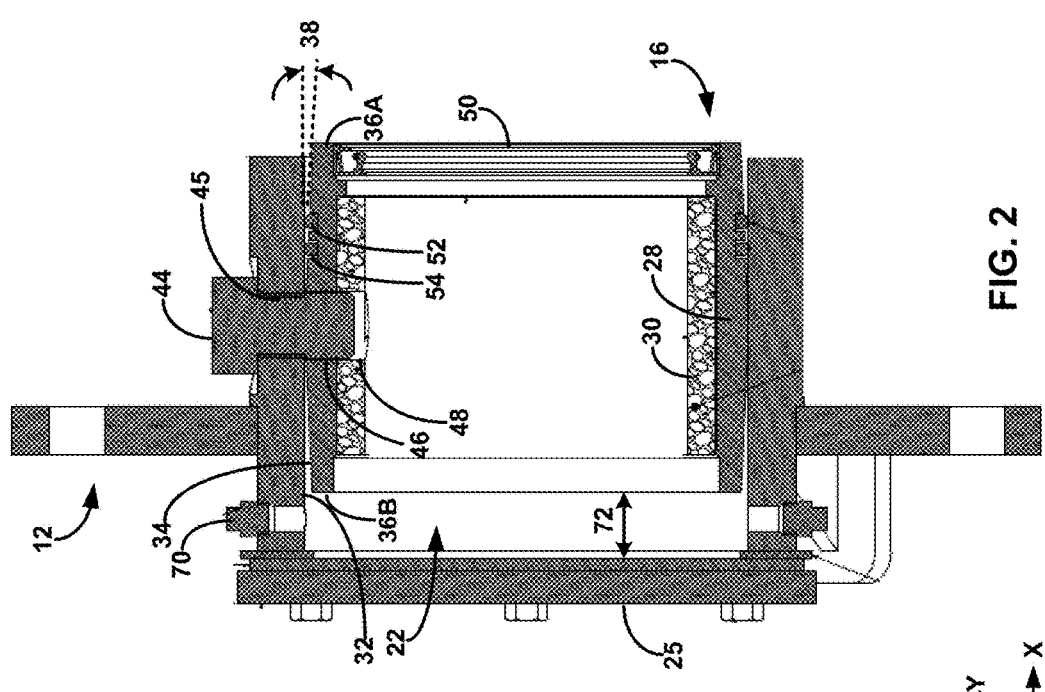
FIG. 2
FIG. 3

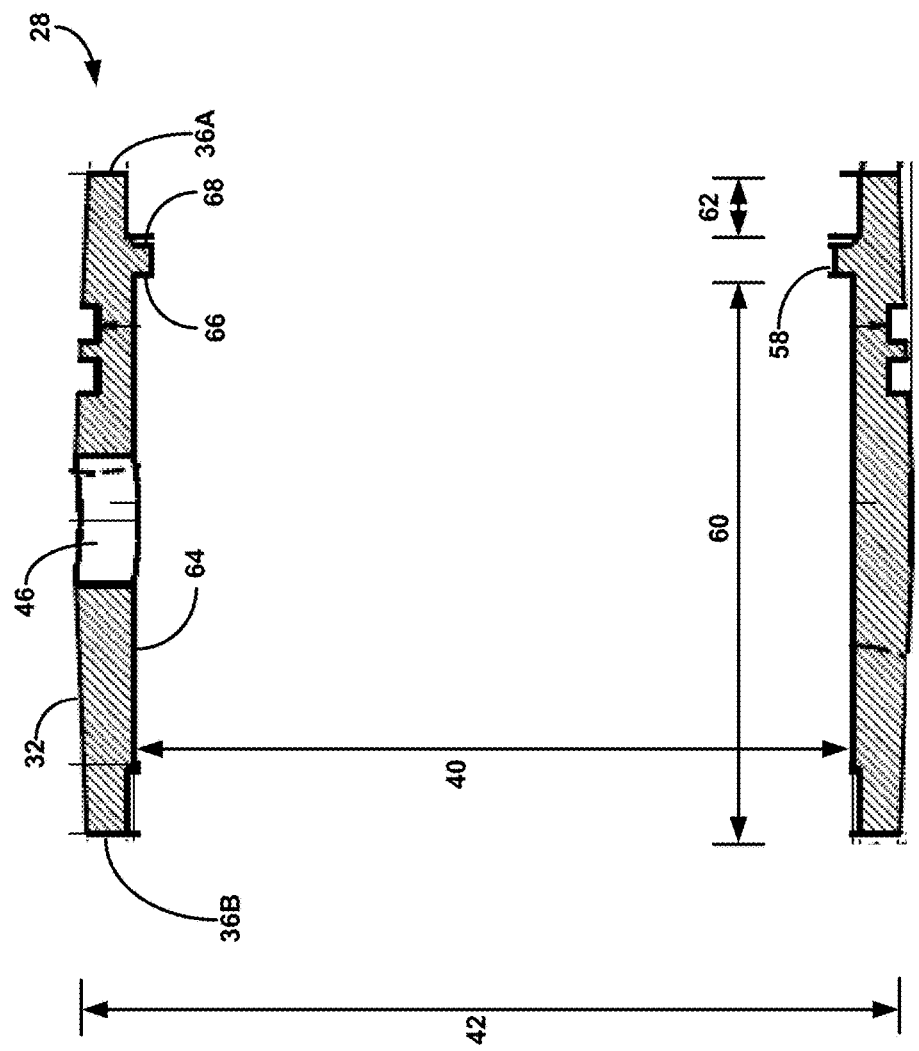

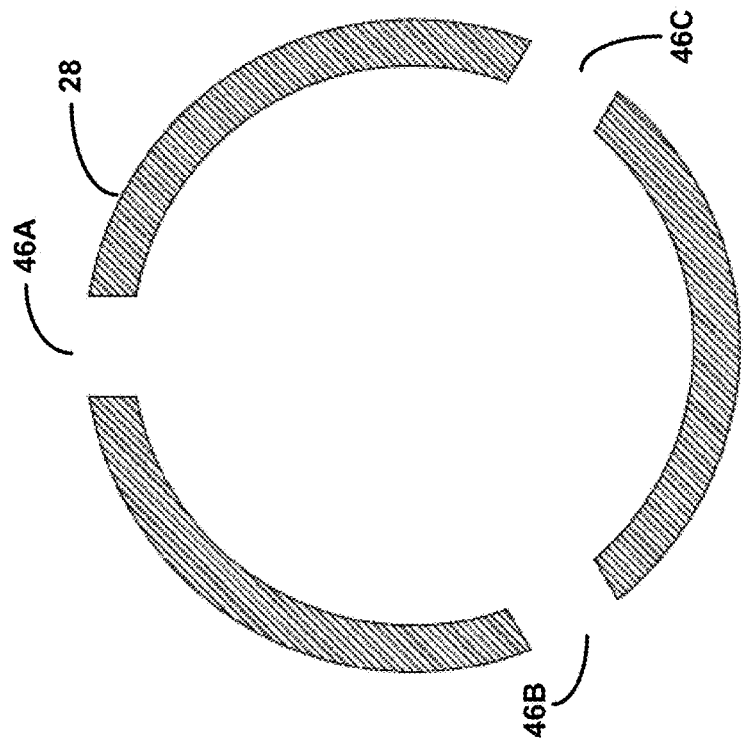
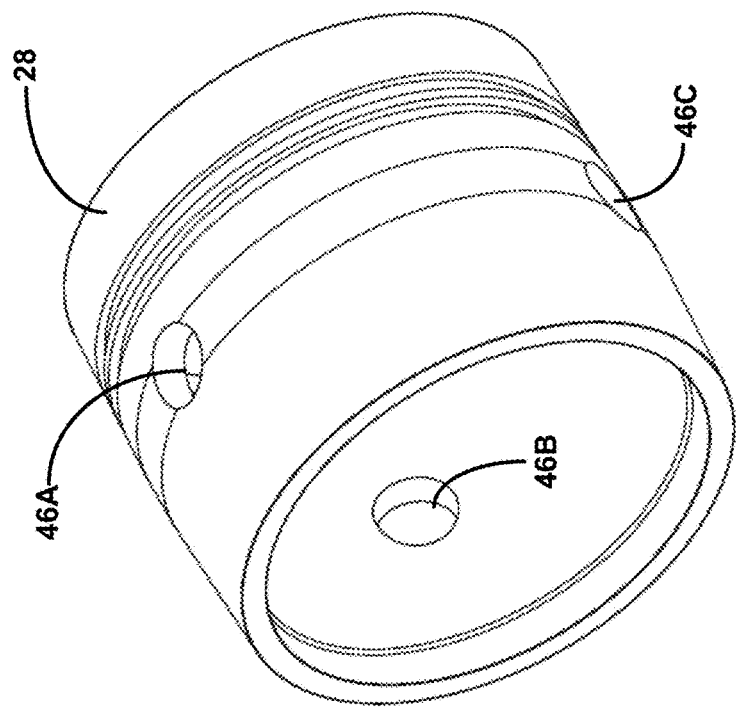
FIG. 5B
FIG. 5A

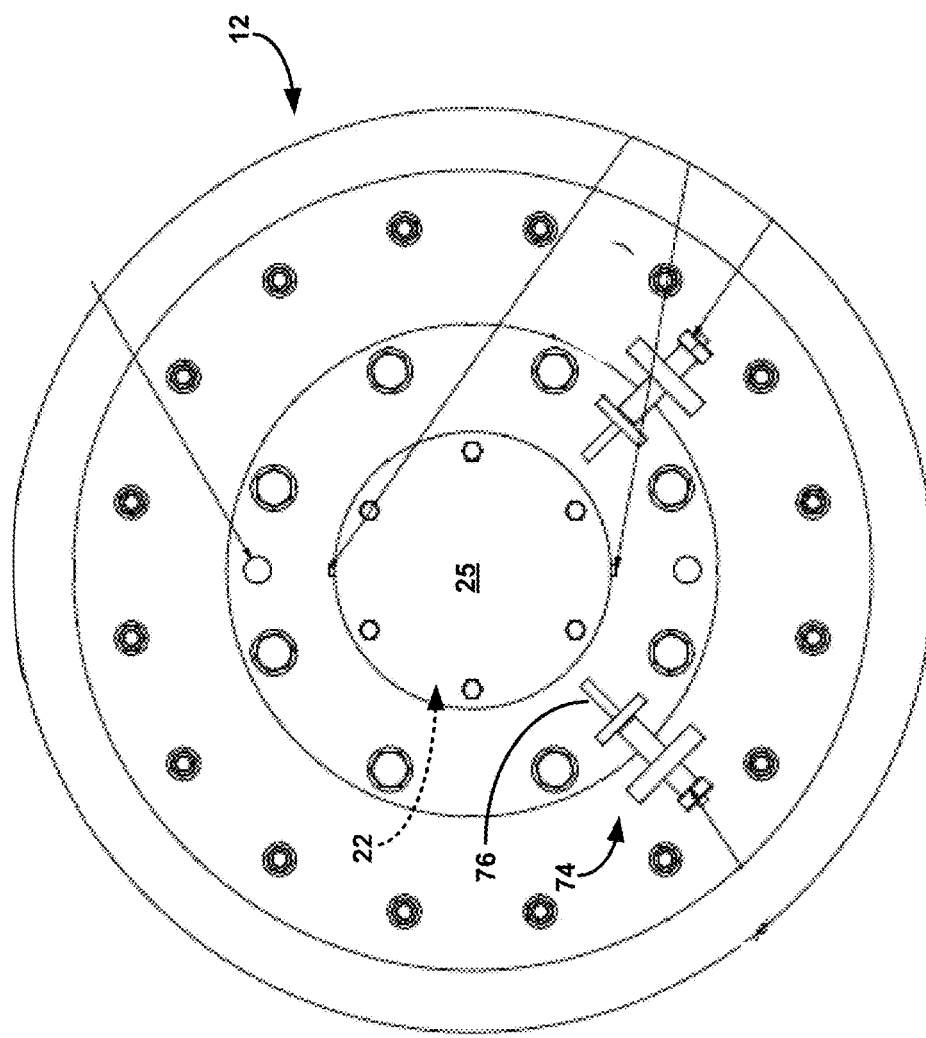

BEARING ASSEMBLY FOR EXTRACTOR SYSTEMS

TECHNICAL FIELD

This disclosure relates to bearing assemblies and, more particularly, to bearing assemblies for liquid extractor systems.

BACKGROUND

A variety of different industries use extractors to extract and recover liquid substances entrained within solids. For example, producers of oil from renewable organic sources use extractors to extract oil from oleaginous matter, such as soybeans, rapeseed, sunflower seed, peanuts, cottonseed, palm kernels, and corn germ. The oleaginous matter is contacted with an organic solvent within the extractor, causing the oil to be extracted from a surrounding cellular structure into the organic solvent. As another example, extractors are used to recover asphalt from shingles and other petroleum-based waste materials. Typically, the petroleum-based material is ground into small particles and then passed through an extractor to extract the asphalt from the solid material into a surrounding organic solvent.

In higher volume processing facilities, operators use a continuous extractor to process a continuously flowing stream of material. The extractor includes a chamber in which solids material being processed and solvent are intermixed, allowing soluble components to be extracted from the solids material into the solvent. For example, an immersion extractor typically utilizes a pool of solvent through which solids material being processed is conveyed. The solvent and solids material may be conveyed in countercurrent directions through the immersion extractor, causing the concentration of extracted components in the solvent to increase from the solvent inlet to the solvent outlet while the concentration of the components in the solid material correspondingly decreases from the solids inlet to the solids outlet.

In practice, a conveyance system used to move solid material being processed through the extractor typically includes a conveyor driven by one or more drive shafts. The conveyor may also be connected to one or more idler shafts that rotate concurrent with but do not drive the conveyor. Each shaft of the conveyance system may be connected through a sidewall of the extractor and supported by a bearing assembly. The bearing assembly can constrain movement of the shaft relative to the sidewall of the extractor and also reduce friction between the shaft and the sidewall of the extractor during rotation.

Where shaft and bearing assembly are located below the liquid level of the extractor, the bearing assembly can be exposed to solvent, solid material being processed and other fouling material during operation. Over time, these materials have a tendency to degrade the bearing assembly, potentially necessitating costly and time consuming shutdown of the extractor. For example, if a submerged bearing assembly needs to be replaced, thousands of gallons of solvent may need to be evacuated from the extractor and placed in temporary storage to allow access to the bearing assembly for repair or replacement. Ensuring that an extractor bearing assembly provides reliable, long-term service can help ensure the safe and efficient operation of the extractor.

SUMMARY

In general, this disclosure relates to bearing assemblies, such as bearing assemblies for liquid service applications where the bearing assembly is intermittently or continuously exposed to liquid. While the bearing assembly can find utility in a number of different applications, in one specific example, the bearing assembly is utilized on an extractor system that moves a solid material through a pool of solvent flowing in a countercurrent direction to the direction of solid material travel. The bearing assembly can be operatively connected to and support a shaft (e.g., an idler shaft) of a conveyance system that moves solid material through the extractor. In addition to minimizing friction between the shaft and the sidewall of the extractor, the bearing assembly may partially or fully block fluid held in the extractor from leaking out through the shaft opening. In these applications, the assembly can function as both a seal and bearing assembly.

While the bearing assembly can have a variety of different configurations, in some examples, the bearing assembly includes an annular sleeve and an annular bearing. The annular sleeve is designed to be installed over the end of a rotatable shaft and positioned inside of a housing through which the rotatable shaft at least partially protrudes. The annular sleeve has an outer surface and length parallel to the rotational axis of the rotatable shaft. The outer surface of the annular sleeve may or may not taper radially inwardly along at least a portion of the length of the sleeve. For example, the annular sleeve may reduce in cross-sectional area along a portion of its length from a region of comparatively large cross-sectional area to a region of comparatively small cross-sectional area. When the bearing assembly is installed in a housing opening have a substantially constant cross-sectional area, the tapered outer surface of the annular sleeve can allow the bearing assembly to articulate or pivot inside of the housing. The bearing assembly can pivot about the taper, for example with an area of larger cross-sectional area acting as a fulcrum, such that a portion of the outer surface is in contact with the housing while another portion of the outer surface is in contact with the housing.

Configuring the bearing assembly with a tapered profile can be useful for a variety of reasons. The tapered profile can facilitate installation of the bearing assembly into a housing opening by providing a leading end of reduced cross-sectional area. The leading end of reduced cross-sectional area can help guide the bearing assembly into the housing opening. Additionally, the tapered profile can allow the bearing assembly to pivot when the shaft connected to the bearing assembly is rotating. This is useful to maintain intimate contact between the bearing assembly and shaft if a bending moment is applied to the shaft. For example, if the bearing assembly were not configured to pivot, a moment load in addition to a shear load may be transmitted through bearing assembly into the housing. This moment load can create non-uniform contact pressure at the interface between the bearing assembly and shaft, potentially increasing wear of the bearing assembly. By coupling the bearing assembly to the shaft and allowing the bearing assembly to pivot within the housing, the moment load can be transmitted through the bearing assembly uniformly, helping to prevent damage to the bearing assembly.

In addition to or in lieu of configuring the bearing assembly with a tapered profile, the bearing assembly can have one or more seals. For example, the bearing assembly may include a first seal extending around an interior perimeter of the assembly that engages the rotatable shaft. The bearing assembly may further include a second seal extending around an exterior perimeter of the assembly that engages the housing into which the assembly is installed. The seals can help prevent fluid held on one side of the housing into which the bearing assembly is installed from leaking through the bearing assembly. Further, the seals can prevent solid material from reaching the sliding surface of the bearing assembly, which can otherwise accelerate wear of the bearing assembly. The seals can also cushion movement between the shaft and the housing when the bearing assembly pivots, damping forces between the components.

Although the bearing assembly can be used in a variety of different systems, in one application, the bearing assembly is installed in the port of a liquid-containing vessel, such as an extractor. The terminal end of the rotatable shaft can protrude into the bearing assembly located in the port, allowing the sidewalls of the vessel to support the weight of the shaft. The port may be enclosed by an end plate to prevent any liquid from the vessel bypassing the bearing assembly from leaking out of the system. The end plate may also function as a thrust plate, limiting axial motion of the rotatable shaft. In some configurations, one or more flushing portions are installed in the end plate or the sidewall of the port adjacent thereto. The flushing ports can be used to periodically flush the bearing assembly to remove agglomerated solids, liquids, and/or other fouling materials tending to degrade the bearing assembly. This can help increase the service life of the bearing assembly.

In one example, a bearing system is described that includes a housing, a rotatable shaft, and a bearing assembly. The housing forms a bore with an inner surface. The rotatable shaft protrudes at least partially through the bore. Further, the bearing assembly is positioned within the bore of the housing between the inner surface of the bore and the rotatable shaft. The bearing assembly includes an annular sleeve and an annular bearing. The annular sleeve has an outer surface and a length, with the length being parallel to a rotational axis of the rotatable shaft. The outer surface tapers radially inwardly along at least a portion of the length such that a portion of the outer surface is in contact with the inner surface of the bore and a portion of the outer surface is out of contact with the inner surface of the bore. In addition, the annular bearing is mounted about the rotatable shaft and inside of the annular sleeve.

In another example, a bearing assembly is described that includes an annular sleeve configured to be installed over a distal end of a rotatable shaft and positioned inside of a housing through which the rotatable shaft at least partially protrudes. The annular sleeve has an outer surface and a length, with the outer surface tapering radially inwardly along at least a portion of the length such that, when the annular sleeve is positioned inside of the housing, a portion of the outer surface is in contact with an inner surface of the housing and a portion of the outer surface is out of contact with the inner surface of the housing. The bearing assembly further includes an annular bearing configured to be mounted about the rotatable shaft and inside of the annular sleeve.

In another example, an extractor is described that includes an extraction chamber, a conveyor, and a bearing assembly. The extraction chamber is configured to receive an extraction liquid and a solid material to be conveyed through the extraction liquid. The conveyor is configured to convey the solid material through the extraction chamber during extraction and includes a rotatable shaft that protrudes at least partially through a bore formed in a sidewall of the extraction chamber. The bearing assembly is positioned within the bore formed in the sidewall of the extraction chamber and about the rotatable shaft. The bearing assembly includes an annular sleeve and an annular bearing with an outer surface of the annular sleeve being tapered relative to an inner surface of the bore.

BRIEF DESCRIPTION OF DRAWINGS

FIGS. 2 and 3 are an exploded cross-sectional view and a perspective cutaway view, respectively, showing an example configuration of the bearing assembly of FIG. 1.

FIG. 4 is a side view of an example annular sleeve configuration for the bearing assembly of FIGS. 2 and 3.

FIGS. 5A and 5B are perspective and side views, respectively, of an example annular sleeve arrangement that can be used on the bearing assembly of FIG. 1.

FIG. 6 is an illustration of an example shaft positioning mechanism that can be used to support a shaft during installation of a bearing assembly.

DETAILED DESCRIPTION

This disclosure relates to bearing systems, assemblies, and techniques. In some examples, a bearing assembly is configured as a self-contained cartridge that includes an annular bearing retained within an annular sleeve. The annular bearing forms a cylinder having an axial opening extending through the cylinder. The axial opening is sized and shaped to receive the terminal end of a rotatable shaft to which the bearing assembly is intended to be coupled. The annular sleeve extends around the annular bearing and provides a protective surface to the annular bearing. The annular sleeve is sized and shaped to fit within the bore of a housing, such as a flanged port extending through the sidewall of a vessel. In use, the bearing assembly can be positioned over the terminal end of the rotatable shaft while inserting the assembly into the bore of the housing. Once installed, the terminal end of the rotatable shaft is positioned inside of the bearing assembly, in contact with the annular bearing. Further, the annular sleeve is positioned inside of the bore of the housing, in contact with the internal wall surface of the bore. The annular bearing can be formed of a comparatively low-friction material, such as a graphite impregnated polymer, to reduce the amount of friction between the shaft and the bearing assembly during rotation. Bearing systems and assemblies according to the disclosure can have a variety of different configurations and features, as described herein.

Figure 1:
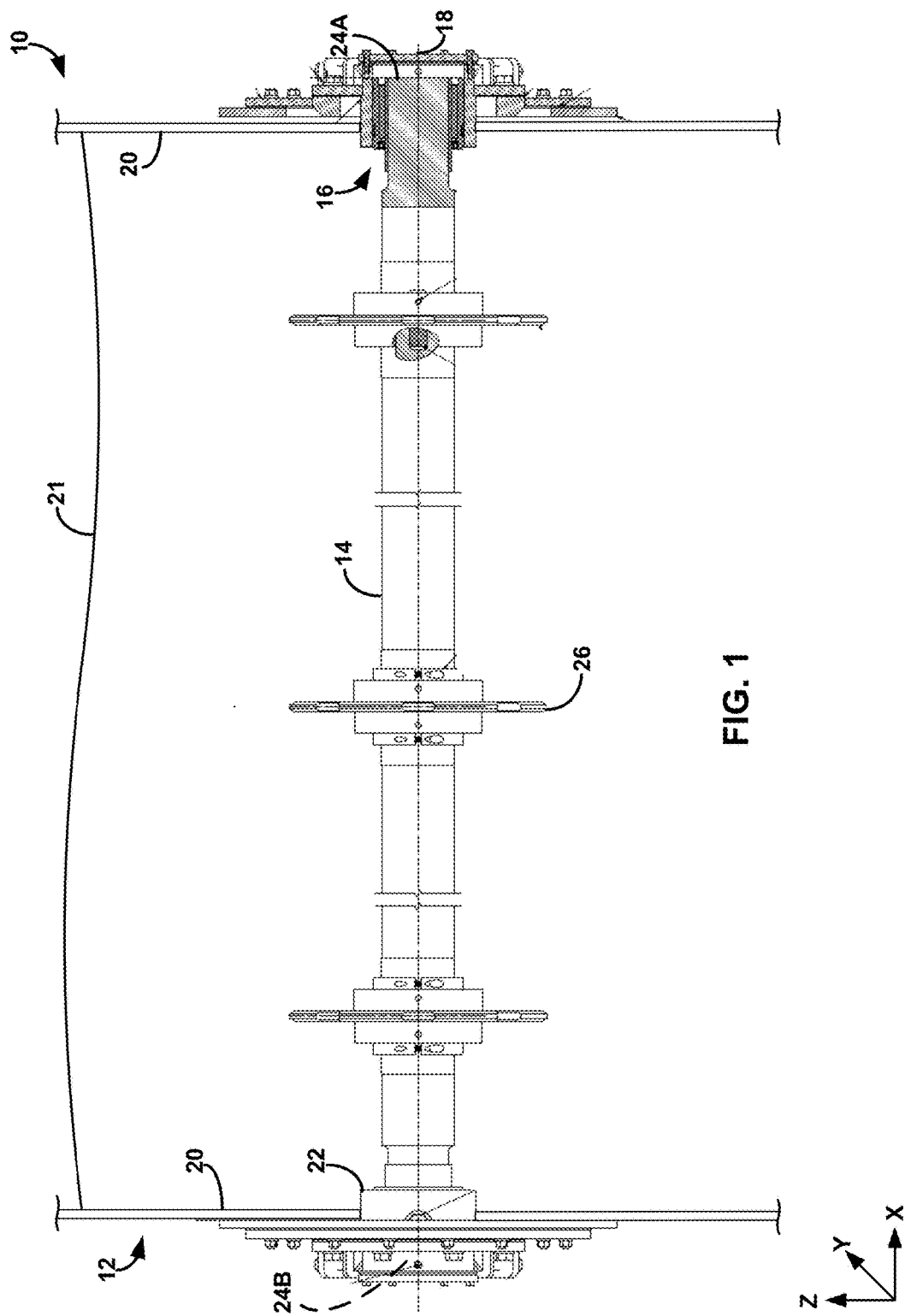
FIG. 1 is an illustration of an example bearing system that includes a bearing assembly in accordance with the disclosure.

FIG. 1 is side view illustration of an example bearing system 10 that includes a housing 12, a rotatable shaft 14, and a bearing assembly 16. Rotatable shaft 14 extends across housing 12 and is coupled to the housing by a pair of bearing assemblies 16 on opposite ends of the shaft (only one of which is shown in cross section for purposes of illustration). In operation, rotatable shaft 14 can rotate (e.g., in 360 degree revolutions) about an axis of rotation 18 within bearing assemblies. Each bearing assembly 16 can support and transfer the weight of rotatable shaft 14 to housing 12. Each bearing assembly 16 can also provide one or more low friction surfaces to facilitate rotation of shaft 14 relative to housing 12.

In practice, housing 12 may be implemented as any type of structure in which bearing assembly 16 is usefully implemented. As various examples, housing 12 may be a processing vessel that receives solid and/or liquid material for processing (e.g., an agitation tank, a solid-liquid extraction chamber), a pump, or any other structure through which a rotatable shaft extends. For example, as described in greater detail in connection with FIG. 7, housing 12 can be an extraction chamber of an immersion extractor and rotatable shaft 14 can be the shaft of an extractor conveyor system.

In the illustrated example, housing 12 is shown as a vessel configured to contain liquid such that rotatable shaft 14 and bearing assembly 16 are submerged below the liquid level 21 of the vessel. Housing 12 in this configuration includes a pair of spaced apart sidewalls 20 separated by rotatable shaft 14. Each sidewall 20 forms a bore or an opening 22 into which a respective bearing assembly 16 is inserted. In operation, rotatable shaft 14 can rotate relative to bearing assembly 16 while the assembly, or a component thereof, remains in fixed position relative to housing 12.

Shaft 14 extends from a first terminal end 24A to a second terminal end 24B opposite the first terminal end. Shaft 14 protrudes at least partially, and some examples fully, through bore 22 of housing 12. For example, depending on the length of shaft 14 and bore 22, the first terminal end 24A of the shaft may be positioned inside of the bore (as illustrated in FIG. 1) or project out beyond wall 20 and bore 22 formed therein. Bearing assembly 16 is positioned within bore 22 between shaft 14 and housing 12.

The configuration of shaft 14 can vary depending on the type of system in which bearing assembly 16 is implemented. In general, shaft 14 provides an elongated body (e.g., having a length in the X-direction indicated on FIG. 1 greater than a width or thickness) that transmits power by rotation. Shaft 14 is typically cylindrical with a circular cross-sectional shape in the Y-Z plane indicated on FIG. 1, although other shapes can be used without departing from the scope of the disclosure. In the configuration of FIG. 1, shaft 14 includes at least one sprocket 26, which is illustrated as a plurality of sprockets positioned at spaced-apart positions along the length of the shaft. Each sprocket can engage a chain of a conveyance system such that the shaft rotates concurrent with the chains during operation of the conveyance system. While shaft 14 is illustrated in FIG. 1 as a non-driven idler shaft, in other configurations, shaft 14 can be connected to a drive motor to function as a drive shaft.

FIGS. 2 and 3 are an exploded cross-sectional view and a perspective cutaway view of a portion of system 10 from FIG. 1 showing an example configuration of bearing assembly 16 (shown without rotatable shaft 14 inserted into the assembly for purposes of illustration). As shown in the illustrated example, bearing assembly 16 is inserted into housing 12. Bearing assembly 16 includes an annular sleeve 28 and an annular bearing 30. Annular bearing 30 is positioned inside of annular sleeve 28 and, in some examples, fixedly coupled to the annular sleeve. Annular bearing 30 may be configured to receive shaft 14 in FIG. 1 (e.g., first terminal end 24A of the shaft) by inserting the terminal end of the shaft into and/or through the bearing (e.g., in the negative X-direction indicated on FIG. 2). Accordingly, annular bearing 30 may have an internal size and shape (e.g., internal diameter) that corresponds to an outer size and shape (e.g., outer diameter) of rotatable shaft 14. Once rotatable shaft 14 is inserted into bearing assembly 16 and, in particular, annular bearing 30, the shaft 14 and/or terminal end 24A thereof may be in direct contact with annular bearing 30. Annular bearing 30 can provide a comparatively low-friction surface about which rotatable shaft 14 can rotate.

To receive bearing assembly 16, housing 12 in FIGS. 2 and 3 includes bore 22 extending at least partially, and in some cases fully, through a sidewall of housing 12. Bore 22 may form a lumen (e.g., cylinder) configured (e.g., sized and shaped) to receive bearing assembly 16 with at least a portion of the bearing assembly contacting the bore. For example, bore 22 can be sized so that bearing assembly 16 is configured to friction fit into the bore. In these applications, bore 22 may define an internal cross-sectional dimension (e.g., internal diameter) substantially equal to or equal to an external cross-sectional dimension (e.g., external diameter) of bearing assembly 16.

While housing 12 and bore 22 can have a variety of different configurations, in the example of FIGS. 2 and 3, bore 22 is illustrated as a port. The port can extend through (e.g., project outwardly from) wall 20 of housing 12 in FIG. 1. The port may include a flange for making mechanical couplings to the port. For example, when bearing assembly 16 is not installed in the port, the port may provide a passage way for communicating fluid from outside of housing 12 to an interior of the housing. The port is shown covered by an end plate 25 that seals the port. End plate 25 may function as a thrust plate against which terminal end 24A of rotatable shaft 14 (FIG. 1) thrusts during operation, thereby the end of the shaft within the port.

In the example configuration of FIGS. 2 and 3, bore 22 of housing 12 forms an inner surface 32 that contacts annular sleeve 28 of bearing assembly 16, when the bearing assembly is inserted into the bore. Bore 22 may have a substantially constant cross-sectional area across its length (e.g., in the X-direction indicated on FIG. 2) or may have a cross-sectional area that is different at one or more locations from a cross-sectional area at one or more other locations. In the illustrated configuration, for instance, bore 22 is cylindrical and has a constant internal diameter over the region in which bearing assembly 16 is positioned.

As mentioned above, bearing assembly 16 includes an annular sleeve 28 and an annular bearing 30. Annular sleeve 28 may be an annular, or ring-shaped, structure having an inner opening into which annular bearing 30 and shaft 14 (FIG. 1) are inserted. Annular sleeve 28 defines an outer surface 34 which, when bearing assembly 16 is inserted into bore 22 of housing 12, contacts the inner surface 32 of the bore. Annular sleeve 28 may function as a protective tube fitting over and/or enclosing annular bearing 30. For example, annular sleeve 28 may be formed of a stronger and/or more-robust material than annular bearing 30, helping to protect the annular bearing from degradation during transport, assembly, and operation of bearing assembly 16. In different examples, annular sleeve 28 may be formed of metal (e.g., stainless steel), ceramic, or other material compatible with the operating environment in which bearing assembly 16 is used.

To allow flexing and constricted vertical movement of shaft 14 during rotation (e.g., movement in the Z-direction indicated on FIGS. 2 and 3), annular sleeve 28 may include a taper about which annular bearing assembly can pivot. The taper may reduce the cross-sectional area of annular sleeve 28 from a region of greater cross-sectional area (e.g., outer diameter) to a region of lesser cross-sectional area. As a result, when the tapered annular sleeve 28 is positioned inside of bore 22 having a uniform cross-sectional area, bearing assembly 16 can pivot between a position in which the region of smaller cross-section area is out of contact with inner surface 32 of the bore and a position in which the region of smaller cross-section area is in contact with the inner surface. In other configurations, however, annular sleeve 28 is not tapered but instead has a constant cross-sectional area (e.g., diameter) across its length. In these configurations, bearing assembly 16 may have other advantageous design features as described herein without having a tapered profile.

In the configuration illustrated in FIG. 2, outer surface 34 of annular sleeve 28 tapers radially inwardly toward a geometric center of the sleeve. Annular sleeve 28 has a length (e.g., in the X-direction indicated on FIG. 2) extending from a first end 36A of the annular sleeve to a second end 36B of the annular sleeve. Annular sleeve 28 in this example has a maximum outer diameter at a position approximately halfway along the length of the annular sleeve between first end 36A and second end 36B. Outer surface 34 of annular sleeve 28 tapers radially inwardly from the maximum outer diameter position to the first end 36A and also to the second end 36B. Accordingly, in this configuration, annular sleeve 28 has an outer diameter at first end 36A and the second end 36B that is smaller than the maximum outer diameter along the length of the annular sleeve between the first end and the second end.

Once installed within bore 22 of housing 12, the region of annular sleeve 28 having the enlarged (e.g., maximum) outer diameter can function as a fulcrum for bearing assembly 16. The location of maximum outer diameter may act as a fulcrum in that it provides a location on which the tapered ends of annular sleeve 28 project away from the contact point of the maximum outer diameter. For example, outer surface 34 of annular sleeve 28 may be in direct physical contact with inner surface 32 of bore 22 where the annular sleeve has its maximum outer diameter; the portions of annular sleeve 28 that have a diameter less than the maximum outer diameter may be out of contact (e.g., not in physical contact) with inner surface 32 of bore 22.

The contact location between outer surface 34 of annular sleeve 28 and inner surface 32 of bore 22 can function as a pivot point about which bearing assembly 16 can rotate (e.g., within the constraints of the wall surfaces of bore 22). For example, depending on the degree of rotation permitted by bearing assembly 16 and bore 22, annular sleeve 28 may pivot clockwise from a position in which the outer surface of the sleeve at second end 36B is out of contact with the inner surface 32 of the bore (as illustrated in FIG. 2) to a position in which the upper side of the outer surface of the sleeve contacts the inner surface of the bore at second end 36B. Conversely, pivoting annular sleeve 28 counterclockwise can move the sleeve from a position in which the outer surface of the sleeve at second end 36B is out of contact with the inner surface 32 of the bore (as illustrated in FIG. 2) to a position in which the lower side of the outer surface of the sleeve contacts the inner surface of the bore at second end 36B.

In the illustrated example, outer surface 34 of annular sleeve 28 tapers continuously along the length of the sleeve from the maximum diameter region to the first end 36A and the second end 36B. The maximum diameter region may be the portion of annular sleeve 28 having the largest cross-sectional area, for example, excluding any additional cross-sectional area provided by a seal positioned about annular sleeve 28 (when used). In some configurations, outer surface 34 of annular sleeve 28 tapers towards a geometric center of the sleeve at an angle 38. Angle 38 may be any value within the range from 0.1 degrees to 10 degrees, such as 0.5 degrees to 5 degrees, or from 1 degree to 4 degrees, although other angles can be used in different applications. In other examples, annular sleeve 28 does not taper at a constant angle along its length but instead has discrete steps or multiple different angles of taper along its length. Independent of the configuration of the taper, the taper may reduce the outer diameter of annular sleeve 28 from a region of larger cross-sectional area to a region of lesser cross-sectional area.

In addition, although annular sleeve 28 is illustrated in FIGS. 2 and 3 as having a bi-directional taper toward the first and second ends 36A, 36B of the sleeve, in other configurations, the annular sleeve may taper only in one direction. For example, annular sleeve 28 may have a maximum outer diameter at first end 36A or second end 36B and taper in a single direction toward the opposite end. In still other configurations, annular sleeve 28 may not taper but instead may have a constant or substantially constant outer diameter across its length.

Bearing assembly 16 also includes annular bearing 30. Annular bearing 30 may be an annular, or ring-shaped, structure configured to fit inside of annular sleeve 28 and having an inner opening configured to receive shaft 14 (FIG. 1). For example, annular bearing 30 may be formed of one or more cylinder elements configured to slide over the terminal end of shaft 14 and be positioned inside of annular sleeve 28. Annular bearing 30 can constrain movement between shaft 14 and housing 12 and also reduce friction between the components during rotation of the shaft. In some examples, annular bearing 30 is a self-lubricating bearing that is impregnated with a lubricating material. For example, annular bearing 30 may be formed of a ceramic or polymer that contains a lubricating material, such as oil, graphite, or other lubricant. In one example, annular bearing 30 includes a blend of a polymer (e.g., polytetrafluoroethylene), graphite, and carbon fiber formed into a matrix. In another example, annular bearing 30 is formed of PEEK (polyetheretherketone), which may or may not include additives such a graphite and/or carbon fiber. Annular bearing 30 can be formed of other materials, and the disclosure is not limited in this respect.

Annular bearing 30 is positioned inside of annular sleeve 28. In some examples, annular bearing 30 is in direct physical contact with annular sleeve 28 along the length of the annular bearing. For example, annular bearing 30 may be friction fit inside of annular sleeve 28, thereby directly contacting the annular sleeve along the outer surface of the annular bearing. In instances where annular sleeve 28 defines a cylindrical cavity into which annular bearing 30 is inserted, the inner diameter of annular sleeve 28 may be slightly larger than the outer diameter of annular bearing 30 to facilitate insertion of the annular bearing in the annular sleeve. For example, the inner diameter of annular sleeve 28 may be less than 1/100 of an inch larger than the outer diameter of annular bearing 30. In some configurations, annular bearing 30 is a singular tubular bearing having a length greater than one half the length of annular sleeve 28, such as greater than three quarters of the length of the annular sleeve.

FIG. 4 is a side view of annular sleeve 28 illustrating an example arrangement for the sleeve. As shown, annular sleeve 28 has an inner diameter 40 and an outer diameter 42. The inner diameter 40 of annular sleeve 28 is constant along the length of the annular sleeve over a region in which annular bearing 30 is configured to be positioned. Accordingly, when an annular bearing 30 with a constant outer diameter is inserted into annular sleeve 28 in such a configuration, the outer surface of the annular bearing may be flush with the inner surface of the annular sleeve.

With further reference to FIGS. 2 and 3, bearing assembly 16 is illustrated positioned inside of bore 22 of housing 12.

First terminal end 24A of rotatable shaft 14 (FIG. 1) can be inserted into bearing assembly 16. Once assembled, rotatable shaft 14 can rotate relative to bearing assembly 16. In some configurations, rotatable shaft 14 rotates relative to bearing assembly 16 while annular sleeve 28 and annular bearing 30 do not rotate (e.g., remain stationary). In other configurations, rotatable shaft 14 rotates relative to bearing assembly 16 by rotating annular bearing 30 within annular sleeve 28. In these configurations, rotatable shaft 14 and annular bearing 30 may be coupled together and configured to rotate simultaneously. In the illustrated configuration, annular sleeve 28 and annular bearing 30 are configured to remain in a fixed rotational position while rotatable shaft 14 rotates inside of annular bearing 30. For example, during operation, rotatable shaft 14 may frictionally engage annular bearing 30 and rotate within the bearing while the bearing remains non-rotatable.

To restrain annular sleeve 28 and annular bearing 30 against rotation of rotatable shaft 14, bearing assembly 16 includes a retaining member 44. Housing 12 has a retaining member receiving opening 45 configured to receive the retaining member. In addition, annular sleeve 28 has a retaining member receiving opening 46 extending through the sleeve, and annular bearing 30 has an axially aligned retaining member receiving opening 48 extending at least partially into the bearing. Retaining member 44 is inserted through the receiving opening 45 of housing 12, through receiving opening 46 of annular sleeve 28, and into the receiving opening 48 of annular bearing 30. Retaining member 44 retains annular sleeve 28 and annular bearing 30 against rotation of rotatable shaft 14. In different examples, retaining member 44 can be implemented using a bolt, pin, or other rigid element to hold annular sleeve 28 and annular bearing 30 in a fixed rotational position. For example, in instances where retaining member 44 is a threaded bolt, receiving openings 45, 46, and/or 48 may be correspondingly threaded such retaining member 44 is threadingly engaged in the openings. In other configurations, bearing assembly 16 does not utilize retaining member 44.

In still other configurations, bearing assembly 16 can have more than one retaining member receiving opening 46 extending through annular sleeve 28 and/or retaining member receiving opening 48 extending at least partially into annular bearing 30. For example, bearing assembly 16 may have multiple retaining member receiving openings positioned at different locations about the perimeter of the bearing assembly (e.g., substantially equidistance from each other). Bearing assembly 16 can be rotated so a specific one of the multiple retaining member receiving openings aligns with retaining member receiving opening 45 of housing 12. Thereafter, retaining member 44 can be inserted through the receiving opening 45 of housing 12 and the aligned opening of bearing assembly 16. By configuring bearing assembly 16 with multiple retaining member receiving openings, the wear surfaces of bearing assembly 16 can be repositioned within housing 12, increasing the service life of the bearing assembly.

FIGS. 5A and 5B are perspective and side views, respectively, showing an example configuration of annular sleeve 28 with multiple retaining member receiving openings. In the illustrated example, annular sleeve 28 has three retaining member receiving openings 46A, 46B, and 46C positioned at different locations about the perimeter of sleeve. Annular bearing 30 (not illustrated) can have a corresponding set of retaining member receiving openings to provide pairs of aligned retaining member receiving openings extending through annular sleeve 28 and at least partially into annular bearing 30. Bearing assembly 16 can be rotated so one pair of the retaining member receiving openings is aligned with retaining member receiving opening 45 extending through housing 12 (FIG. 2) and retaining member 44 thereafter inserted through the openings. During subsequent operation, retaining member 44 can be removed from the openings and the bearing assembly 16 rotated so a different pair of retaining member receiving openings is aligned with retaining member receiving opening 45 extending through housing 12. Retaining member 44 can then be inserted through the newly aligned openings and operation resumed.

To help prevent liquid or other materials being processing inside of housing 12 from bypassing bearing assembly 16 and discharging through bore 22, the bearing assembly can include one or more seals. For example, bearing assembly 16 may include an internal seal positioned between annular sleeve 28 and rotatable shaft 14 to help prevent material from passing between the sleeve and shaft. Additionally or alternatively, bearing assembly 16 can include an external seal positioned between annular sleeve 28 and housing 12 to help prevent material from passing between the sleeve and housing. The external seal can also function to help hold annular sleeve 28 on axis within housing 12 and/or cushion or dampen movement between annular sleeve 28 and housing 12 when rotatable shaft 14 pivots.

In the configuration of FIGS. 2 and 3, bearing assembly 16 includes a first seal 50 positioned between an inner surface of annular sleeve 28 and rotatable shaft 14 (when the shaft is inserted into bearing assembly 16). Bearing assembly 16 also includes a second seal 52 positioned between outer surface 34 of annular sleeve 28 an inner surface 32 of bore 22 of housing 12. In the illustrated example, bearing assembly 16 also includes a third seal 54 spaced along the length of annular sleeve 28 from second seal 52. First seal 50 may extend about an internal perimeter of bearing assembly 16 and be configured to contact an external perimeter of rotatable shaft 14. Second seal 52 and/or third seal 54 may extend about an external perimeter of bearing assembly 16 and be configured to contact an internal perimeter of the housing 12 into which the bearing assembly is inserted. Typically, each seal is a ring formed of a material that is more pliable and deformable than annular sleeve 28 and shaft 14, such as a polymeric compound. Although FIGS. 2 and 3 illustrate bearing assembly 16 with three seals, in different configurations, the assembly can include fewer seals (e.g., one or two) or more seals (e.g., four, five, or more). For instance, bearing assembly 16 in FIGS. 2 and 3 can be configured with a fourth seal positioned inside of annular sleeve 28 (spaced axially from first seal 50) to further protect the sliding interface between the annular sleeve and shaft 14.

To retain first seal 50 in bearing assembly 16 during operation, the bearing assembly may include a seal cavity into which the seal is inserted. With reference to FIG. 4, annular sleeve 28 is shown as having a flange 58 that divides annular sleeve 28 into a bearing cavity 60 into which annular bearing 30 is inserted and a seal cavity 62 into which first seal 50 is inserted. Annular sleeve 28 projects radially inwardly from an inner surface 64 of the annular bearing. As a result, flange 58 provides lateral abutment surfaces 66, 68 on opposed sides of the flange. Annular bearing 30 can be inserted into one end of annular sleeve 28 until the end of the annular bearing contacts abutment surface 66 of flange 58. First seal 50 can be inserted into the opposite end of annular sleeve 28 until the sleeve contacts abutment surface 68 of the flange.

Even in instances in which bearing assembly 16 includes one or more seals, contaminating material may bypass the seal(s) during operation. Overtime, accumulated contaminating material may cause wear between shaft 14 and bearing assembly 16 and/or bearing assembly 16 and housing 12. The wear may have a tendency to degrade operation of bearing assembly 16 and reduce the service life of the assembly.

To increase the performance of bearing assembly 16, housing 12 may be configured with one or more flushing portions. The flushing ports can be used to continuously or periodically flush bearing assembly 16 with contaminant free fluid. For example, the flushing ports may be fluidly coupled to pressurized liquid or gas that is used to purge bearing assembly 16, allowing the pressurized fluid to force accumulated contaminants out of the assembly.

In the configuration of FIG. 2, housing 12 includes at least one flushing port 70, which is illustrated as multiple flushing ports positioned about the perimeter of the bore containing bearing assembly 16. In particular, bearing assembly 16 is illustrated as being spaced from end plate 25 a distance to form a cavity 72. The cavity 72 may be an open area or free volume separating the end plate from the end of bearing assembly 16. Flushing port 70 can be an opening extending through the wall of the bore within the open area of cavity 72. In use, flushing port 70 is placed in fluid communication with a flushing source, thereby pushing flushing fluid through bearing assembly 16 toward an interior of housing 12. When not in use, flushing port 70 can be closed with a plug, such as that illustrated in FIG. 2, to seal the port from leaking.

To install bearing assembly 16 over rotatable shaft 14, the rotatable shaft can be positioned inside of housing 12 with terminal end 24A (FIG. 1) of the shaft extending into sidewall 20 and/or bore 22. Subsequently, bearing assembly 16 can be inserted over terminal end 24A of rotatable shaft 14, advancing the bearing assembly from terminal end 24A toward terminal end 24B and into bore 22. Once bearing assembly 16 is suitably positioned within bore 22 and about rotatable shaft 14, the bore can be sealed by securing end plate 25 over the bore.

Typically, the tolerances between sidewall 20, bearing assembly 16, and rotatable shaft 14 will be tight. As a result, bearing assembly 16 may need to be carefully fitted about rotatable shaft 14 and within sidewall 20 to ensure good alignment between the components. To help align rotatable shaft 14 within sidewall 20 during installation of bearing assembly 16, system 10 may include a shaft positioning mechanism. The shaft positioning mechanism may support terminal end 24A of rotatable shaft 14 and substantially center the end of the shaft within the sidewall to allow installation of bearing assembly 16 over the end of the shaft.

FIG. 6 is a side view of housing 12 showing an example shaft positioning mechanism 74 that can be used to support rotatable shaft 14 during installation of bearing assembly 16. Shaft positioning mechanism 74 is secured to the outer surface of housing 12 and includes an extendable arm 76. In use, the extendable arm 76 is advanced outwardly to contact rotatable shaft 14 and lift the shaft from the bottom of bore 22 on which the shaft would otherwise rest. For example, bearing assembly 16 can be placed on the terminal end of shaft 14 while the shaft rests on the bottom of the housing bore. Thereafter, extendable arm 76 is advanced out an amount sufficient to elevate rotatable shaft 14 within bore 22, e.g., so terminal end 24A of rotatable shaft 14 is substantially centered within the bore. Bearing assembly 16 can be pushed into bore 22 while rotatable shaft 14 is held centered within the bore by positioning mechanism 74. Extendable arm 76 can be subsequently retracted and end plate 25 secured over bore 22. In FIG. 6, housing 12 includes two shaft positioning mechanisms 74 radially aligned about rotatable shaft 14, although fewer (one) of more (e.g., three, four, or more) positioning mechanism can be used.

As mentioned above, bearing assembly 16 can be used in a variety of different applications. In one application, bearing assembly 16 is used on a shaft of a conveyor system in an extraction system. For example, the extraction system may be an immersion extractor in which the conveyor system transports solids material being processed through a pool of solvent. The shaft and bearing assembly 16 installed thereon may be submerged below the liquid level of the pool of solvent. The shaft may be operatively coupled to a chain or other endless conveyor loop. The shaft can rotate with the chain or other endless conveyor loop to move solids material being processed through the pool of solvent.

Figure 7:
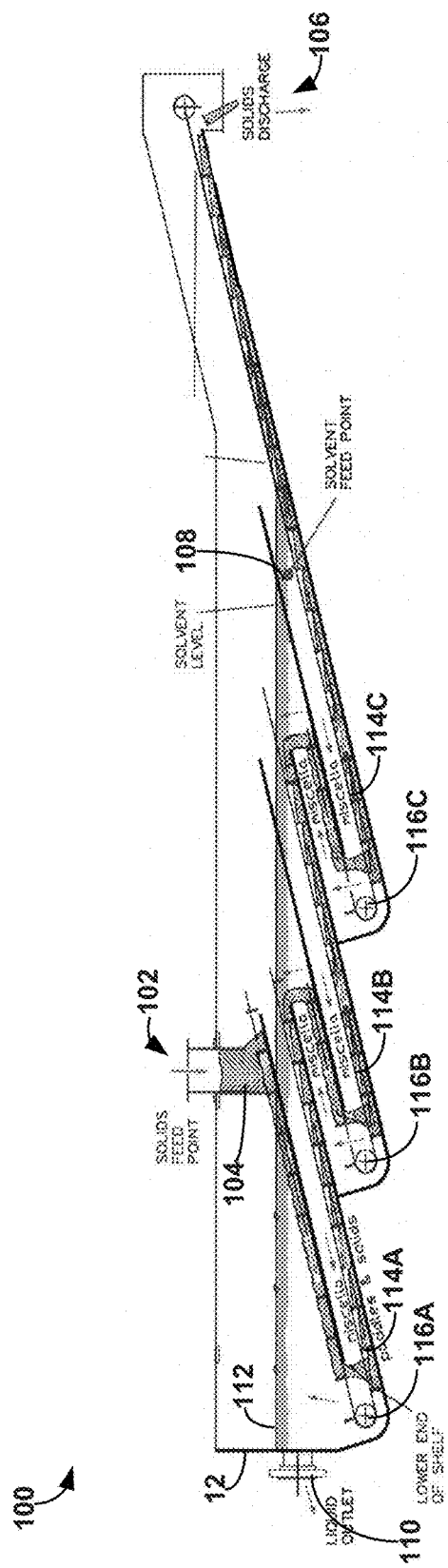
FIG. 7 is a side view of an example extractor that can utilize a bearing assembly according to the disclosure.

FIG. 7 is a side view of an example extractor 100 that can utilize bearing assembly 16 according to the disclosure. Extractor 100 can be used to process a continuous flow of solid material carrying one or more compounds desired to be extracted into a solvent. As shown in this example, extractor 100 includes housing 12 (which may also be referred to as an extraction chamber) containing one or more extraction stages through which a material being processed travels in a countercurrent direction with an extraction solvent. Housing 12 includes a feed inlet 102 configured to receive a continuous flow of solids material 104 carrying an extract to be extracted within extractor 100. Extractor 100 also includes a feed outlet 106 configured to discharge the solids material 104 after some or all of the extract has been extracted into solvent flowing through the extractor.

To provide a flow of solvent passing through extractor 100, housing 12 also includes a solvent inlet 108 that receives solvent devoid of extract or having a comparatively low concentration of extract. A solvent outlet 110 is provided on a generally opposite end of housing 12 to discharge solvent having passed through extractor 100. As solvent travels through housing 12 from inlet 108 to outlet 110, the solvent flows in a countercurrent direction from the flow of solids material 104 passing through the extractor. The solvent intermixes with solids material 104 within extractor 100, causing the extract carried by the solids material to transfer from the solids material to the solvent. Accordingly, in operation, solvent having a comparatively low concentration of extract enters at inlet 108 while solvent having in increased concentration of extract discharges at outlet 110. Likewise, fresh solids material 104 carrying extract enters at inlet 102 while processed solids material having a reduced concentration of extract is discharged at outlet 106. For example, in instances where solids material 104 is an oil-bearing material, solvent can extract oil out of the solids material forming a miscella (the solution of oil in the extraction solvent) that is discharged through outlet 110.

Extractor 100 can process any desired solids material 104 using any suitable solvent. Example types of solids material 104 that can be processed using extractor 100 include, but are not limited to, oleaginous matter, such as soybeans (and/or soy protein concentrate), rapeseed, sunflower seed, peanuts, cottonseed, palm kernels, and corn germ; oil-bearing seeds and fruits; asphalt-containing materials (e.g., asphalt-containing roofing shingles that include an aggregate material such as crushed mineral rock, asphalt, and a fiber reinforcing); stimulants (e.g., nicotine, caffeine); alfalfa; almond hulls; anchovy meals; bark; coffee beans and/or grounds, carrots; chicken parts; chlorophyll; diatomic pellets; fish meal; hops; oats; pine needles; tar sands; vanilla; and wood chips and/or pulp. Solvents that can be used for extraction of solids material 104 include, but are not limited to, acetone, hexane, toluene, isopropyl alcohol, ethanol, other alcohols, and water.

Extractor 100 can be operated as an immersion extractor in which a pool or reservoir of solvent 112 is maintained in housing 12 to provide a desired solvent level inside the extractor. In such applications, solids material 104 is immersed (e.g., submerged) in the pool of solvent 112 as it moves through extractor 100. In some examples, solids material 104 remains completely submerged in the pool of solvent 112 as it travels through extractor 100, e.g., except when adjacent inlet 102 and outlet 106. In other examples, solids material 104 travels above the pool of solvent 112 at different stages in extractor 100 before falling off the end of a conveyor and dropping back into the pool of solvent. As one example, extractor 100 may be implemented using a Model IV extractor commercially available from Crown Iron Works Company of Minneapolis, Minn.

To contact solids material 104 with solvent inside of extractor 100, the extractor has one or more conveyors that convey the material in a countercurrent direction through the pool of solvent 112. In the configuration of FIG. 7, for instance, extractor 100 has three conveyors 114A, 114B, 114C that convey solids material 104 through the solvent pool 112 contained within housing 12. Each conveyor can include one more driven shafts that are operatively coupled to a power source (e.g., a motor) and driven to drive a conveyance line in an endless loop. Each conveyor can also include one or more idler shafts which are not driven but are operatively (e.g., mechanically) coupled to and rotate concurrent with the conveyance line as the conveyance line is rotated in an endless loop. For example, in FIG. 7, conveyors 114A, 114B, and 114C include idler shafts 116A, 116B, and 116C. The shafts of conveyors 114A, 114B, and 114C, including idler shafts 116A, 116B, and 116C, can utilize bearing assembly 16 in accordance with the disclosure. The bearing assembly can be installed over the terminal end of each shaft, e.g., and exposed to liquid from the pool of solvent 112.

In operation, conveyors 114A, 114B, and 114C can move solids material 104 along decks or trays positioned inside of extractor 100 to provide a bed of material. Each bed deck may form a lower receiving end upon which material being processed is deposited and a vertically elevated upper discharge end from which material being processed is discharged. In use, solids material 104 can drop onto the receiving end of a bed deck and then be conveyed along the bed deck by a respective conveyor until reaching the discharge end. Upon reaching the discharge end, solids material 104 can drop off or fall over the terminal edge of the bed deck, for example, onto a lower bed deck.

While extractor 100 provides one particular implementation for bearing assembly 16 discussed above with respect to FIGS. 1-5, bearing assembly can be used in other suitable applications without departing from the scope of the disclosure. Various examples have been described. These and other examples are within the scope of the following claims.

The invention claimed is:

1. A bearing assembly comprising:
an annular sleeve configured to be installed over a distal end of a rotatable shaft and positioned inside of a housing through which the rotatable shaft at least partially protrudes, the annular sleeve having an outer surface and a length, the outer surface tapering radially inwardly along at least a portion of the length such that, when the annular sleeve is positioned inside of the housing, a portion of the outer surface is in contact with an inner surface of the housing and a portion of the outer surface is out of contact with the inner surface of the housing;
an annular bearing configured to be mounted about the rotatable shaft and inside of the annular sleeve; and
a seal.

2. The assembly of claim 1, wherein the seal comprises a first seal on an inner surface of the annular sleeve and a second seal on the outer surface of the annular sleeve.

3. The assembly of claim 2, wherein the annular sleeve has a flange projecting radially inwardly that divides the annular sleeve into a bearing cavity into which the annular bearing is inserted and a seal cavity into which the first seal is inserted.

4. The assembly of claim 1, wherein the annular bearing is a single tubular bearing having a length greater than one half of the length of the annular sleeve and comprises graphite.

5. The assembly of claim 1, wherein the annular sleeve has a first end and second end and defines a fulcrum between the first end and the second, the outer surface of the annular sleeve tapering radially inwardly from the fulcrum to the first end and also from the fulcrum to the second end.

6. The assembly of claim 1, wherein the annular sleeve has an inner diameter and an outer diameter, the inner diameter is constant along the length of the annular sleeve, and the outer diameter reduces as the outer surface tapers radially inwardly.

7. A bearing system comprising:
a housing forming a bore with an inner surface;
a rotatable shaft protruding at least partially through the bore; and
a bearing assembly positioned within the bore of the housing between the inner surface of the bore and the rotatable shaft, the bearing assembly comprising an annular sleeve, an annular bearing, and a seal,
wherein the annular sleeve has an outer surface and a length, the length is parallel to a rotational axis of the rotatable shaft, and the outer surface tapers radially inwardly along at least a portion of the length such that a portion of the outer surface is in contact with the inner surface of the bore and a portion of the outer surface is out of contact with the inner surface of the bore, and the annular bearing is mounted about the rotatable shaft and inside of the annular sleeve.

8. The bearing system of claim 7,
wherein the housing is a vessel containing liquid, the bore is a port extending through a wall of the vessel, and a height of the liquid extends above the port.

9. The bearing system of claim 8, wherein the seal comprises a first seal positioned between an inner surface of the annular sleeve and the rotatable shaft and a second seal positioned between the outer surface of the annular sleeve and the inner surface of the housing.

10. The bearing system of claim 9, wherein the annular sleeve has a flange projecting radially inwardly that divides the annular sleeve into a bearing cavity into which the annular bearing is inserted and a seal cavity into which the first seal is inserted.

11. The bearing system of claim 8, wherein the vessel is an extractor having a conveyance system configured to convey solid material through the extractor during extraction, and the rotatable shaft is operatively coupled to the conveyance system and configured to rotate during movement of the conveyance system.

12. The bearing system of claim 7, wherein the bore is a port extending through a wall of a vessel and a terminal end of the rotatable shaft is located in the port, and further comprising an end plate covering the port.

13. The bearing system of claim 12, wherein the bearing assembly is spaced from the end plate to define a cavity between the bearing assembly and the end plate, and further comprising at least one flushing port in fluid communication with the cavity, the at least one flushing port being configured to be placed in fluid communication with a flushing source for flushing the cavity.

14. The bearing system of claim 7, wherein the annular bearing is a single tubular bearing having a length greater than one half of the length of the annular sleeve.

15. The bearing system of claim 7, wherein the annular bearing is formed of a polymeric material.

16. The bearing system of claim 7, wherein the annular bearing comprises graphite and is self-lubricating.

17. The bearing system of claim 7, wherein the annular sleeve has a first end and second end and defines a fulcrum between the first end and the second end in contact with the inner surface of the bore, and the outer surface of the annular sleeve tapers radially inwardly from the fulcrum to the first end and also from the fulcrum to the second end.

18. The bearing system of claim 7, wherein the annular sleeve has an inner diameter and an outer diameter, the inner diameter is constant along the length of the annular sleeve, and the outer diameter reduces as the outer surface tapers radially inwardly from the portion of the outer surface that is in contact with the inner surface of the bore.

19. The bearing system of claim 7, further comprising a shaft positioning mechanism connected to an external surface of the housing, the shaft positioning mechanism being configured to position and support the shaft within the bore to facilitate positioning of the bearing assembly in the bore.

20. A bearing system comprising:
a housing forming a bore with an inner surface;
a rotatable shaft protruding at least partially through the bore;
a bearing assembly positioned within the bore of the housing between the inner surface of the bore and the rotatable shaft, the bearing assembly comprising an annular sleeve, and an annular bearing; and
a retaining member,
wherein the annular sleeve has an outer surface and a length, the length is parallel to a rotational axis of the rotatable shaft, and the outer surface tapers radially inwardly along at least a portion of the length such that a portion of the outer surface is in contact with the inner surface of the bore and a portion of the outer surface is out of contact with the inner surface of the bore,
the annular bearing is mounted about the rotatable shaft and inside of the annular sleeve, and
the housing, annular sleeve, and the annular bearing each comprise a retaining member receiving opening, the retaining member is inserted through the retaining member receiving opening of the housing and the annular sleeve and at least partially into the retaining member receiving opening of the annular bearing, and the retaining member holds the annular sleeve and the annular bearing in a fixed position relative to the housing against rotation of the rotatable shaft.

21. The bearing system of claim 20, wherein the annular sleeve and the annular bearing each comprise multiple retaining member receiving openings positioned about their perimeter with the retaining member being inserted through a respective one of the multiple retaining member receiving openings of the annular sleeve and at least partially into a corresponding one of the multiple retaining member receiving openings of the annular bearing.

22. The bearing system of claim 20, wherein the retaining member comprises a bolt.

23. A bearing assembly comprising:
an annular sleeve configured to be installed over a distal end of a rotatable shaft and positioned inside of a housing through which the rotatable shaft at least partially protrudes, the annular sleeve having an outer surface and a length, the outer surface tapering radially inwardly along at least a portion of the length such that, when the annular sleeve is positioned inside of the housing, a portion of the outer surface is in contact with an inner surface of the housing and a portion of the outer surface is out of contact with the inner surface of the housing; and
an annular bearing configured to be mounted about the rotatable shaft and inside of the annular sleeve,
wherein the annular sleeve and the annular bearing each comprise a retaining member receiving opening configured to receive a retaining member that retains the annular sleeve and the annular bearing against rotation of the rotatable shaft.

* * * * *